(12) United States Patent
Malloy et al.

(10) Patent No.: US 8,493,871 B2
(45) Date of Patent: Jul. 23, 2013

(54) END-TO END ANALYSIS OF TRANSACTIONS IN NETWORKS WITH TRAFFIC-ALTERING DEVICES

(75) Inventors: Patrick J. Malloy, Washington, DC (US); Antoine Dunn, Kensington, MD (US); Dana Znamova, Rockville, MD (US); Steven Niemczyk, San Francisco, CA (US); Russell Mark Elsner, Bethesda, MD (US); Ryan Gehl, Silver Spring, MD (US); Alex Chernyakov, Bethesda, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 559 days.

(21) Appl. No.: 12/623,592

(22) Filed: Nov. 23, 2009

(65) Prior Publication Data

US 2010/0128623 A1    May 27, 2010

Related U.S. Application Data

(60) Provisional application No. 61/118,322, filed on Nov. 26, 2008.

(51) Int. Cl.
*H04L 12/26* (2006.01)

(52) U.S. Cl.
USPC .......................................................... 370/248

(58) Field of Classification Search
USPC .................. 370/229–258, 389–394, 468–477
See application file for complete search history.

(56) References Cited

U.S. PATENT DOCUMENTS

| | | | |
|---|---|---|---|
| 6,137,782 A * | 10/2000 | Sharon et al. | 370/255 |
| 6,538,997 B1 * | 3/2003 | Wang et al. | 370/241 |
| 6,801,940 B1 | 10/2004 | Moran et al. | |
| 2003/0046416 A1 * | 3/2003 | Heuer | 709/232 |
| 2004/0073655 A1 * | 4/2004 | Kan et al. | 709/224 |
| 2005/0013324 A1 * | 1/2005 | Leahy et al. | 370/474 |
| 2006/0168205 A1 * | 7/2006 | Barron et al. | 709/224 |
| 2007/0016670 A1 * | 1/2007 | Cooper | 709/224 |
| 2007/0058631 A1 * | 3/2007 | Mortier et al. | 370/392 |
| 2008/0008178 A1 * | 1/2008 | Tychon et al. | 370/392 |

* cited by examiner

*Primary Examiner* — Jeffrey M Rutkowski
(74) *Attorney, Agent, or Firm* — Robert M. McDermott (57) ABSTRACT

In a network that includes intermediary nodes, such as WAN accelerators, that transform messages between nodes, an end-to-end path of the messages is determined. The determined end-to-end path is used in subsequent analysis of message traces, to identify timing and other factors related to the performance of the network relative to the propagation of these messages, including the propagation of the transformed messages. A variety of techniques are presented for determining the path of the messages, depending upon the characteristics of the collected trace data. Upon determining the message path, the traces are synchronized in time and correlations between the connections along the path are determined, including causal relationships. In a preferred embodiment, a user identifies an application process between or among particular nodes of a network, and the system provides a variety of formats for viewing statistics related to the performance of the application on the network.

40 Claims, 4 Drawing Sheets

END-TO END ANALYSIS OF TRANSACTIONS IN NETWORKS WITH TRAFFIC-ALTERING DEVICES

This application claims the benefit of U.S. Provisional Patent Application 61/118,322, filed 26 Nov. 2008.

BACKGROUND AND SUMMARY OF THE INVENTION

This invention relates to the field of network analysis, and in particular to a method and system for tracking message flow through nodes that disassociate the network addresses from some or all of the message packets, and/or transform the packet content.

The desire for high-speed communications often exceeds the capabilities of the physical communication channels on a network using conventional communication techniques. To satisfy the users' desire for higher speed, network or service providers often augment their channels with devices that optimize the throughput of the channels, without requiring changes to the manner in which the users' applications communicate.

In a number of network environments, one or more elements are configured to enhance the performance of the network by initiating actions that bypass or otherwise avoid the strict sequences associated with typical communication transactions. For example, some communication protocols call for an acknowledgement of receipt of a prior transmission by the destination node before sending a subsequent transmission, and some intermediate devices, commonly termed 'proxy' devices, are configured to avoid this requirement by 'spoofing' the transmitting node with an acknowledgement long before the destination node provides the actual acknowledgement. In another example, an intermediate device may be configured to 'pre-fetch' data on behalf of a requesting node, in anticipation of a request for that data by the requesting node.

Figure 1A:
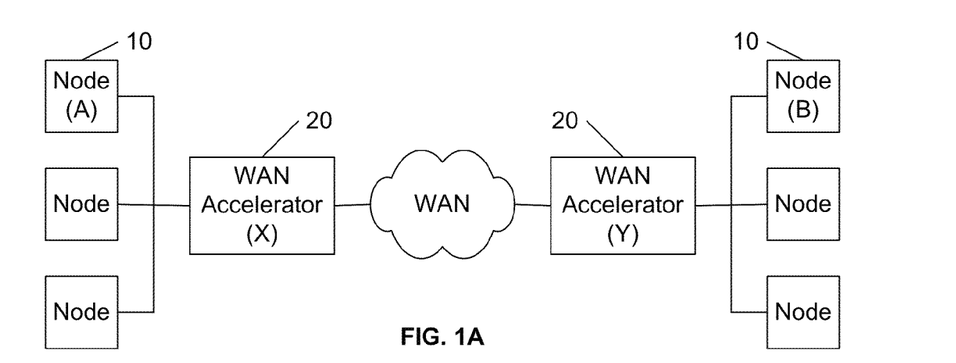
FIG. 1A illustrates an example block diagram of a network that includes WAN accelerators.

WAN optimization devices, commonly termed WAN accelerators, have been developed to further enhance these delay-avoidance techniques by operating in tandem using specific protocols that are designed for such tandem devices. FIG. 1A illustrates a typical network configuration using a pair of WAN accelerators 20. Each network node 10 on either side of the network is substantially unaware of the presence of the accelerators 20, and each accelerator 20 is configured to operate as a proxy node for the network nodes 10, appearing as conventional destination network nodes 10. That is, the WAN accelerator 20 communicates with the node 10 using a conventional communication protocol common to nodes 10, and communicates with the other WAN accelerator 20 using a communication protocol that is designed to optimize communications between the accelerators 20. For example, each WAN accelerator 20 will generally include a large amount of storage for caching data that has been sent to the nodes 10, and each WAN accelerator 20 keeps track of the data that is stored at the other WAN accelerator 20. When a source node 10 subsequently initiates a transmission of some or all of a prior transmission to a destination node 10, the WAN accelerator 20 at the source side of the network merely sends a command to the WAN accelerator 20 on the destination side of the network to initiate a transmission of this previously stored data from its cache to the destination node, thereby avoiding an actual transmission of the data across the network, transparent to either the source or destination nodes. Other techniques for accelerating traffic flow are common in the art of WAN acceleration.

Because of the fact that WAN accelerators and similar optimizing devices are designed to be transparent to the end nodes, their relationship to these end nodes is also generally transparent to network analysis devices. In the example of FIG. 1A, a packet sent from node A to node B is conventionally encoded, identifying A as the source and B as the destination. When this conventionally encoded packet is received at accelerator X, the packet addressing information and content are encoded by accelerator X into an optimized form and transmitted as a message having X as the source and Y as the destination. When this optimized message is received at Y, the original message from A to B is recreated and transmitted as a conventionally encoded message with A as the source and B as the destination. Trace devices placed on the network will see A-to-B messages and X-to-Y messages, with no indication that the X-to-Y messages correspond to the transmission of the A-to-B messages across the X-to-Y link.

The lack of association of related messages significantly limits the effectiveness of network analysis systems. Network performance analysis systems need to be aware of which network traffic is associated with a given transaction, to understand the causalities within the transaction, and estimate how the processing of the transaction might be improved. For example, network analysis systems are often used to diagnose performance problems and to assess the performance of the network under varying conditions and configurations. If a user complains of degraded performance, a network analysis system will generally be used to collect the information from trace devices and track the path of the complaining user's messages to determine where the degradation is being introduced. When the link or device causing the problem is identified, and possible changes are considered for alleviating the problem, the network analysis system can be used to estimate the effect that each proposed change will have on curing or mitigating the reported problem.

In the example of FIG. 1A, for example, because the relationship between messages A-to-B and X-to-Y is transparent to conventional trace devices and analysis systems, the causal relationship between the performance of the X-Y link and the performance of the A-to-B link is absent, and conventional techniques for tracing, isolating, and diagnosing reported performance problems will be ineffective.

Even if the optimizing device does not modify the addresses, the modification of the conventional traffic flow, and/or the modification of the data content will often introduce a lack of correspondence between traces in a network analysis system. For example, a conventional 'spoofing' technique is for an accelerator to place a message in its buffer, acknowledge receipt of the message on behalf of the recipient, and then send the message on to the recipient. When the recipient receives the message, the recipient will send an acknowledgement back to the original source, and the accelerator will intercept the acknowledgement, because an acknowledgement for that message was already sent to the original source. However, when the trace files at the source and destination are processed, the receipt of the acknowledgement at the source will appear to have occurred before the sending of the acknowledgment from the destination, and the conventional network analysis system will assume that the time bases of the source and destination need to be modified to avoid this apparently impossible receipt-before-sending.

In like manner, conventional network analysis systems perform a process of 'merging' the trace files, to eliminate redundant records of the same message. Often, the size of a message is used as one of the criteria for determining whether two messages are identical. If the optimizing device changes the content, using compression techniques, for example, the determination that a record of the compressed message corresponds to another record of the uncompressed message may not be made, and both records will be included in subsequent statistical reports, traffic flow diagrams, and the like.

It would be advantageous to be able to recognize the correspondence among different forms of the same message. It would also be advantageous to use the correspondence among different forms of the same message to facilitate effective network analysis and diagnostics. It would also be advantageous to use the correspondence among different forms of the same message to determine the end-to-end characteristics and dependencies of messages sent between particular nodes. It would also be advantageous to recognize the correspondence among different forms of the same message with minimal user input requirements.

These advantages, and others, can be realized by a method and system that traces a path of messages communicated between nodes even when the messages may undergo transformation of their address and/or content, then includes the transforming devices in subsequent performance determinations and other system analysis tasks. A variety of techniques are presented for determining the path of the messages, depending upon the characteristics of the collected trace data. Upon determining the message path, the traces are synchronized in time, and correlations between the connections along the path are determined, including causal relationships. In a preferred embodiment, a user identifies an application process between or among particular nodes of a network, and the system provides a variety of formats for viewing statistics related to the performance of the application on the network.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Also in the following description, the term 'packet' is often used, because packet-based protocols are the most common at the time this description is being written. One of skill in the art will recognize that the principles of this invention will be applicable regardless of the particular protocol used to communicate messages between or among nodes. The term 'message' is used herein as the more general term to indicate a communication between or among nodes, and, in a packet-based protocol, a message may include one or more packets. In like manner, the term 'transaction' is used herein as a general term for communications between or among nodes, typically including one or messages in each direction between the nodes. Additionally, for clarity, the term 'connection' is used as a general term for a logical connection between devices, whereas 'communications link', or 'link', is used to identify a physical connection between the devices. The term 'flow' is used as a general term for the propagation of messages associated with a connection.

The invention is presented in the context of network nodes/devices that transform messages to improve the performance of applications being run on the network, typically by transforming the messages into a form that is better suited for communication over a wide area network (WAN). One of skill in the art will recognize that although this invention is particularly well suited for analyzing networks with WAN accelerators, the principles of this invention can be applied regardless of the purpose of the message transformation, and regardless of the type of network that is used to propagate the transformed messages. For example, a common network security technique is the use of Network Address Translation (NAT) at devices that connect a private network to a public network, wherein the source address of each outgoing message is replaced by a particular public address. When a message addressed to this public address is received, it is subject to one or more security checks before the NAT device replaces the public address with the original source address and forwards it to the original source.

In a typical embodiment of this invention, a variety of techniques are used at each stage of the process of analyzing the end-to-end transactions in networks with traffic-altering devices, because the particular nature of the information available will vary depending on a variety of factors, such as the particular devices used to alter the traffic, the location of the trace devices relative to the traffic-altering device, the characteristics of the trace data, and so on.

For ease of reference and understanding, the invention is initially presented using an example determination of an end-to-end path of messages between nodes based on the use of a combination of MAC addresses and IP addresses. Alternative techniques for use at the various stages of the process are subsequently presented.

Figure 1B:
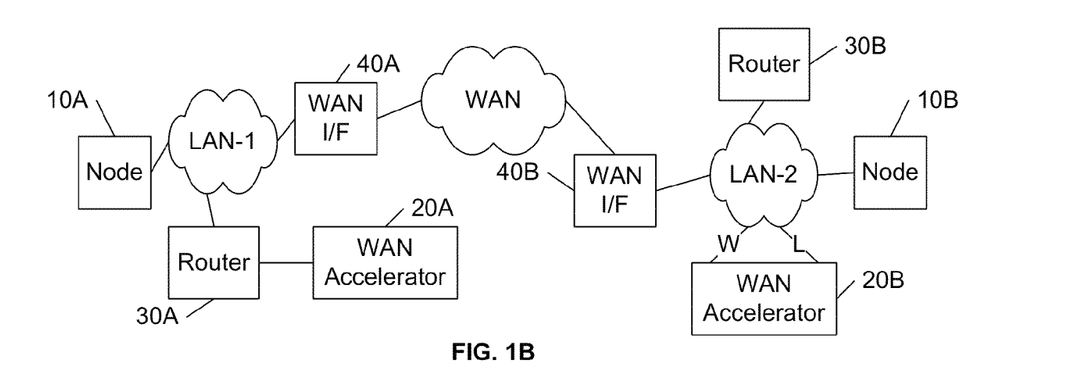
FIG. 1B illustrates a more detailed block diagram of a network that includes WAN accelerators.

FIG. 1B illustrates a block diagram of a network that includes WAN accelerators 20A and 20B, including examples of different arrangements of these traffic-altering devices. Although more detailed than the block diagram of FIG. 1A, the representation of the network in FIG. 1B is a simplified view of a network, for ease of understanding. For example, the network of FIG. 1B includes two local area networks, LAN-1 and LAN-2, and a wide area network, WAN, connecting these LANs; also in FIG. 1B only two end nodes 10A, 10B are illustrated, for ease of understanding. One of skill in the art will recognize that the principles of the invention that are explained using these simplified examples, are applicable to networks of significantly greater complexity.

In operation, node 10A creates a message addressed to node 10B, and transmits it to the local area network, LAN-1. A router 30A on LAN-1 determines that the message is addressed to a node that is external to LAN-1, and should be routed via the WAN to LAN-2. In this example, the router 30 is coupled directly to the WAN accelerator 20A, and is configured to send some or all of the messages that are to be routed to the WAN to the accelerator 20A for optimization before submission to the WAN interface 40A.

The accelerator 20A processes the LAN message addressed to node 10B, and converts it to an optimized message addressed to accelerator 20B on LAN-2. Typically, the accelerator 20A will also generate response messages to node 10A, such as the aforementioned acknowledgements that appear to have been sent from node 10B. In this example, a single communications link is used between the router 30A and the accelerator 20A, and both the original message and the transformed message (herein termed the LAN message and the WAN message, respectively, for convenience) will appear on this link.

When the resultant WAN message is sent to the router 30A, the router 30A forwards the WAN message to the WAN interface 40A for transmission over the WAN to LAN interface 40B on LAN-2. These interfaces 40A, 40B will typically be embodied in a router, such as routers 30A, 30B, but are illustrated as separate entities for ease of presentation and understanding.

In this example, the WAN accelerator 20B is not directly connected to router 30B, and therefore router 30B will route the WAN message to the accelerator 20B for reconstituting the original LAN message via LAN-2. The accelerator 20B is illustrated as having two interfaces (connections to LAN-2), one (W) for sending and receiving WAN messages, the other (L) for sending and receiving LAN messages. Upon receipt of the WAN message, the accelerator 20B recreates the original LAN message, which is addressed to node 10B, and submits it to LAN-2. Depending upon the particular configuration, node 10B will retrieve the recreated LAN message directly, or router 30B will route the LAN message to node 10B.

One of skill in the art will recognize that in some cases, the messages communicated to node 10B may be substantially different from the original, depending upon the particular operations performed by the accelerators. For example, if the accelerator 20A is able to satisfy a repeated request for data from node 10B by providing it from its cache memory, it need not forward the request to node 10B. In other cases, a modified message may be communicated to node 10B. The paradigm of recreation of the original message is used herein for ease of presentation and understanding.

Messages sent from node 10B to node 10A will undergo a similar process, being transformed to WAN messages by accelerator 20B, sent to LAN-1 via the WAN, and reconverted into their original form, or a functionally equivalent form, by accelerator 20A.

As noted above, the substitution of messages addressed between accelerators 20A and 20B for messages between nodes 10A and 10B is designed to be transparent to the nodes 10A and 10B, and as such, the trace files are unlikely to contain any information that directly indicates such a substitution. In a conventional network analysis system, an analysis of trace files at LAN-1 and LAN-2 will indicate a transmission of a message from node 10A to node 10B at a particular time, a reception of a message from node 10A to node 10B at a second time, with no further details regarding events that may have happened during the intervening time, such as the WAN optimization and transmission. Additionally, due to the 'spoofing' performed by the accelerators 20A and 20B, the out-of-sequence acknowledgements will generally interfere with the required synchronization of time bases at LAN-1 and LAN-2. The lack of correspondence between the LAN and WAN messages is further compounded by the fact that the optimizer will generally be processing other LAN messages as well, and the transformed 10A-10B messages will be mixed among all of the other transformed messages.

Figure 2:
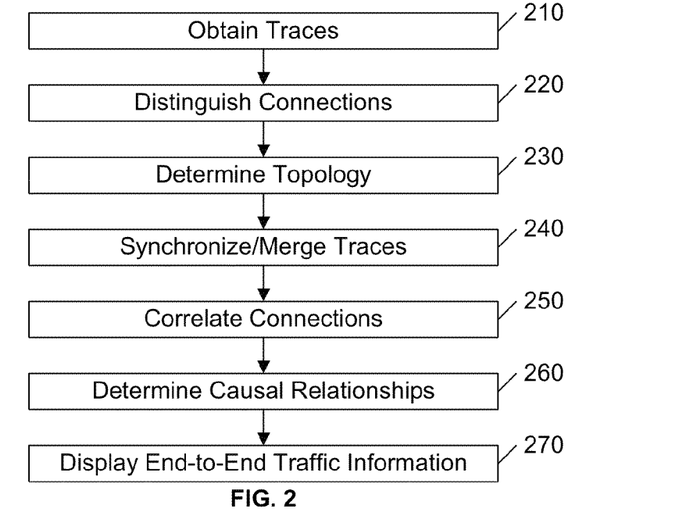
FIG. 2 illustrates a flow diagram for performing end-to-end analysis of application messages in a system that includes nodes that transform the address and/or content of some or all of the messages.

FIG. 2 illustrates an example flow diagram for performing end-to-end analysis of transactions between nodes of a network that includes message-transforming devices.

At 210, the appropriate traces are obtained, typically by asking the user for the names of the trace files that contain the traces that are to be analyzed. It is significant to note that the contents of a trace file will be dependent upon the location of the trace-collection device (not illustrated). In the example of FIG. 1B, for example, the link between WAN accelerator 20A and router 30A will contain both LAN and WAN traffic, and a trace device placed on this link will detect both types of messages. If, on the other hand, a trace device is placed on either the W or L link between the WAN accelerator 20B and LAN-2, it will only collect one form of traffic, WAN traffic or LAN traffic, respectively. In like manner, depending upon the particular configuration of LAN-2, a trace device placed on the link between the node 10B and LAN-2 may only collect LAN traffic, and may only collect the LAN traffic addressed to or from node 10B.

Typically, trace-collection devices will be placed throughout the network to serve a variety of tasks, and may not be placed at optimal points for any particular task, including the current task of end-to-end tracking of messages that undergo transformation. Therefore, as noted above, a preferred embodiment of this invention is configured to implement a variety of techniques for analyzing traffic traces. Generally, the trace files should contain the records of the LAN messages communicated to and from each node of interest, and messages communicated across the WAN corresponding to these LAN messages. Depending upon the particular placement of the trace-collection devices, these records may be collected by as few as two trace-collection devices, placed at the site of each of the nodes of interest, on a link that includes both the LAN and WAN messages, or on particular devices, such as the routers 30A, 30B, the accelerators 40A, 40B, and so on.

Figure 3A:
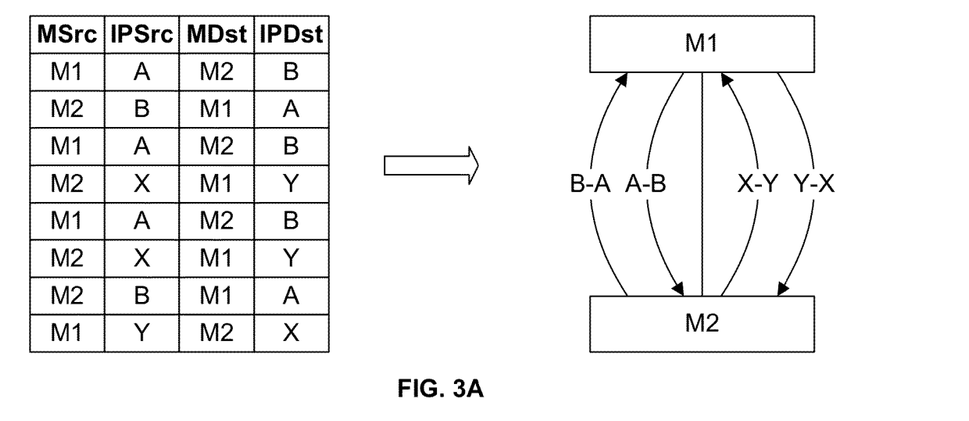
FIGS. 3A-3C illustrate an example determination of flows between MAC interfaces based on message traces.
Figure 3B:
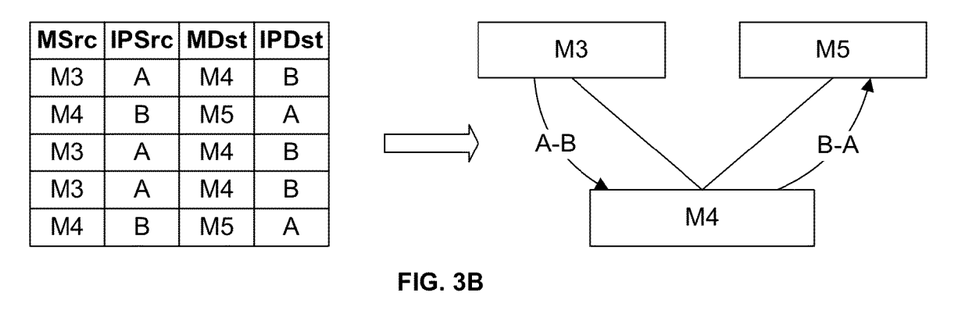
Figure 3C:
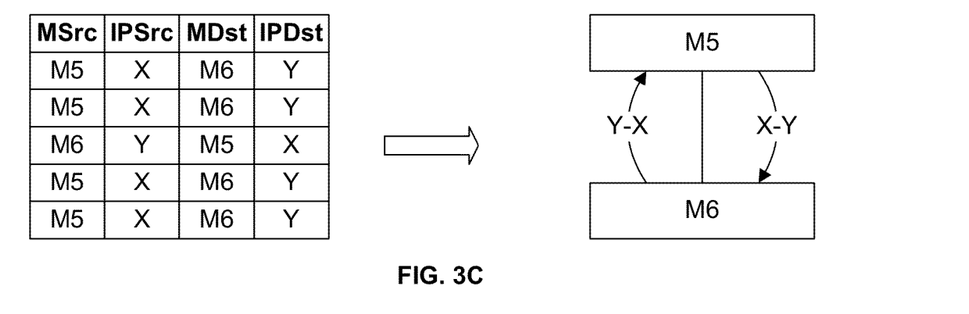

At 220, the trace files are analyzed to determine the individual links and the traffic flow across each link. The traffic flow is defined in terms of the (logical) connections that apparently use the link. FIGS. 3A-3C illustrate example determinations of links and traffic flow (connections) from three sample traces based on MAC addresses and IP addresses. As noted above, this is one of a variety of techniques that can be used in the stage of the invention; other techniques are presented further below. In a typical embodiment of this invention, multiple techniques may be applied during each stage, including, for example, applying a given technique to verify the links and connections determined by a prior applied technique, or to select from among a number of possible links and connections determined by the prior applied technique.

In FIG. 3A, the trace file illustrates records of traffic between two MAC addresses, M1 and M2. As is known in the art, a MAC address uniquely identifies each network interface device; if a node has multiple network interface devices, each device will have a different MAC address. These interfaces M1 and M2 are illustrated on the right side of FIG. 3A with a connecting line between them. Note that the connecting line represents a determined link between M1 and M2. This link indicates that M1 and M2 are physically connected, it does not necessarily mean that they are directly coupled to each other; that is, the physical coupling may include other physical devices between M1 and M2.

The first entry in the trace of FIG. 3A (M1, A, M2, B) indicates a message from M1 to M2 (MSrc=MAC source interface; MDst=MAC destination interface). This message has a source IP address (IPSrc) of "A", and a destination IP address (IPDst) of "B". Thus, the system can determine that messages addressed from A to B travel from M1 to M2, as illustrated by the arrow A-B from M1 to M2. In like manner, the second entry (M2, B, M1, A) indicates that messages addressed from B to A travel from M2 to M1, as illustrated by the arrow B-A from M2 to M1.

The fourth entry in the trace of FIG. 3A (M2, X, M1, Y) indicates that messages from X to Y also travel from M2 to M1, and the eighth entry (M1, Y, M2, X) indicates that messages from Y to X travel from M1 to M2. These connections are similarly illustrated between interfaces M1 and M2 at the right of FIG. 3A.

FIG. 3B illustrates a second trace, and includes messages between MAC addresses M3, M4, and M5. The first entry indicates that messages from A to B (the same IP addresses A, B of FIG. 3A) travel from M3 to M4, and the second entry indicates that messages from B to A travel from M4 to M5. These determined links and connections are illustrated on the right side of FIG. 3B.

FIG. 3C illustrates a third trace, and includes messages between MAC addresses M5 and M6 (the same MAC address M5 of FIG. 3B). The first entry indicates that messages from X to Y (the same IP addresses X, Y of FIG. 3A) travel from M5 to M6, and the third entry indicates that messages from Y to X travel from M6 to M5. These determined links and connections are illustrated on the right side of FIG. 3C.

It is significant to note that at this point, the relationship between the links of FIGS. 3A, 3B, and 3C is unknown. In particular, the order in which these links appear in the network topology is unknown.

In an analysis of actual trace files, many connections may be found. In a conventional network analysis process, a variety of techniques are available for filtering the messages that are irrelevant to the particular analysis. For example, if the analysis is being performed to assess communications between A and B, all messages that are not between A and B would be filtered out. At this stage of the process of this invention, however, the system does minimal filtering, because it is known/assumed that some transformation is performed (else the user would not have chosen to apply this invention to the trace files), and the messages that are conventionally filtered out may, in fact, correspond to the transformation of the messages between A and B. The filtering of irrelevant messages is performed later in the process, as detailed further below.

Returning to the flow of FIG. 2, at 230, a topology corresponding to the determined links and connections is determined. It is significant to note that the determined topology need only be as detailed as required for synchronizing and/or merging the trace files. That is, using the example of FIGS. 3A-3C, if A and B are the addresses of the nodes of interest, the topology determination need only identify the relative location of the nodes of addresses X and Y (and other nodes identified in the trace files). For ease of reference, a node of address A is referred to herein as node A; a node of address B is referred to as node B; etc.

To determine the topology, each determined link is initially identified as being associated with its corresponding site, i.e. the site of each node of interest, on either side of the WAN. A number of techniques can be applied at this stage of the process as well. In the simplest case, the user is initially queried for the site that each of the trace files was obtained. In the example of FIGS. 3A-3C, in the absence of a user identification, it might be assumed that the traces of FIGS. 3B and 3C were obtained at a common site, because they both reference MAC address M5. Other techniques are available for determining/estimating the site to which each trace is associated, as detailed below. In the absence of user identification, the assumed site may be used until subsequent analysis indicates that the choice was incorrect, in which case the system backtracks, chooses the alternative, and proceeds with the new assumption.

Figure 4:
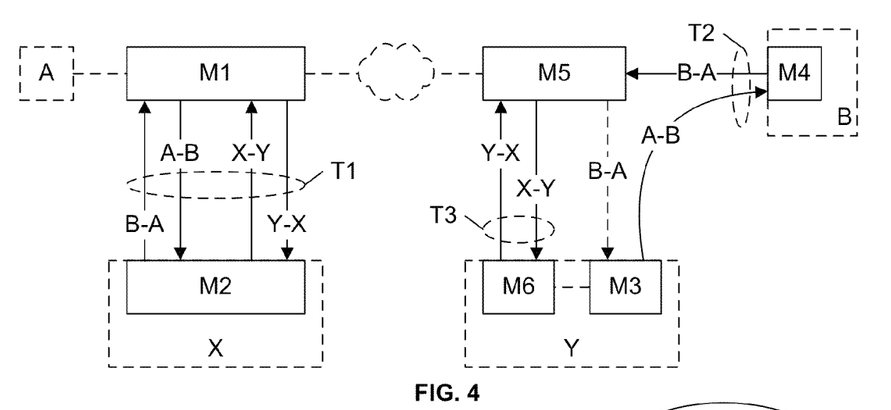
FIG. 4 illustrates an example determination of an end-to-end path of messages in a network that includes message altering devices, based on the flows between MAC interfaces.

FIG. 4 illustrates a determined topology based on the assumption and/or determination that trace file 3A was obtained at the "A" side of the WAN, and trace files 3B and 3C were obtained on the "B" side of the WAN. The topology on the "A" side is directly determinable from the determined link on the A side. Because messages from A to B travel from M1 to M2, node A must provide the messages to M1, and because messages from A to B are not further seen on other interfaces (i.e. their flow appears to end at M2), it is reasonable to assume that interface M2 is an interface of a transforming device, or an interface that leads to a transforming device. The flow from X to Y leaves M2, and therefore the transforming device on this side of the WAN is node X, and the messages from X to Y are the transformed WAN messages corresponding to LAN messages from A to B.

If node X is on the "A" side, node Y is determined to be on the "B" side. At this point, the topology determination is complete for the purposes of this invention with respect to the arrangement of nodes A, B, X and Y (A-X-Y-B), but for the sake of completeness, a feasible topology corresponding to the determined links and connections of FIGS. 3A-3C is illustrated in FIG. 4. Hypothesized links and devices are illustrated with dashed lines, and the likely locations of the trace-collection devices for the traces of FIGS. 3A, 3B, 3C are illustrated as T1, T2, and T3, respectively.

As noted above, even if the topology of FIG. 4 does not correspond exactly to the true topology, it is substantially immaterial to this invention, because the only topology information that is required is that A is connected to X, X is connected to Y, and Y is connected to B (as contrast to A being connected to Y, Y to X, and X to B).

In a typical application of this invention to an actual network, other connections on the determined links may also be found, and each of these connections would be similarly assessed to determine at which site each of the identified nodes is located. Subsequent processes, detailed below, will serve to eliminate the connections that are not associated with the messages from A to B.

Returning again to the flow of FIG. 2, at 240, the trace files are synchronized and merged. As the term 'trace file' is used herein, each determined flow (LAN traffic at site A, WAN traffic at site A, WAN traffic at site B, and LAN traffic at site A) is considered to form its own trace file. That is, even though the trace T1 of FIG. 4 (and FIG. 3A) includes both LAN and WAN traffic, the A-B and B-A traffic will be segregated from the X-Y and Y-X traffic to form two trace files. The traces T2 and T3 comprise the LAN and WAN trace files at site B, respectively. Techniques for synchronizing and merging trace files are common in the art, and include, for example the techniques described in U.S. Published Application 2005/0030979, "SYNCHRONIZING PACKET TRACES", filed 9 Aug. 2004 for Patrick J. Malloy and Antoine D. Dunn, incorporated by reference herein.

The merging process eliminates duplicate records of messages occurring in different trace files. As contrast to conventional synchronization and merging techniques, however, the LAN messages on either side of the WAN are considered to be independent of each other. Accordingly, the aforementioned problems caused by spoofing and other optimizing techniques in conventional network analysis systems are avoided. That is, for example, the apparently common acknowledgement messages from B-to-A, or A-to-B, on the "A" and "B" sides are not considered to be the same messages.

At 250, the system correlates the messages on the links using both conventional and novel techniques, depending upon the nature of the traces. The phrase 'correlate messages' is conventionally used to mean finding corresponding messages in different traces, based on some correlation between the messages. This correlation may be determined based on any of a variety of factors, and the term 'correlation' does not imply any particular technique for determining some relationship between the messages. For example, many optimizing devices perform selective optimization, allowing some messages to be 'passed through' without change, or with minimal changes. The occurrence of these matching or similar messages in multiple traces can be identified using conventional correlation techniques, including the techniques disclosed in U.S. Published Application 2006/0050704, "CORRELATING PACKETS", and 2006/0013228, "PACKET TRACING", each filed 13 Jul. 2005 for Patrick J. Malloy, Michael Cohen, and Alain J. Cohen, and each incorporated by reference herein. In the example of address translation (NAT) devices, which only change the address field, the IP sequence and acknowledgement numbers are commonly used to establish a correlation between messages in different trace files.

In the case of messages that are transformed, the correlation process is modified to define correlation criteria for dissimilar messages. Conventional correlators are often configured to 'score' potential matches based on given criteria, some criteria favorably affecting the score, and other criteria adversely affecting the score, using positive and negative weight factors associated with each criterion.

In the case of accelerators, or other optimization devices, the modified correlation criteria may be based on device-dependent characteristics. For example, the WAN packets in the above paired-accelerator example will contain an identification of the original packets, so that the message can be recreated by the receiving accelerator. If the method of encoding of this information by a particular type of device is known, the correlator can be configured to decode this information and use the decoded information to score the packet. In like manner, if the particular WAN accelerator maintains a one-to-one relationship (or any defined relationship) between the receipt of a LAN packet and the transmission of a WAN packet, performing, for example, only compression, the conventional correlation criteria based on size could be modified to define a possible match to each WAN packet that has a size that is smaller than the size of the LAN packet, or in the case of many-to-one, a size that is smaller than an accumulated size of LAN packets.

As noted above, there may be multiple connections in the traces that could correspond to the transformed LAN traffic, and the correlation process would be applied to each until a definite correspondence is found. That is, for example, if the process at 220 identified other connections in addition to the X-Y and Y-X connections, they would each be assessed to find a flow that consistently correlates to the A-B and B-A traffic flows. Once such a flow is found, there would be no need to subsequently assess each other message in the traffic flow, because it is highly likely that a given optimization device will process the A-B and B-A traffic flows consistently, and use the same IP addresses in the WAN messages. However, nothing in this invention precludes the continual processing of multiple connections if, for example, an optimization device uses multiple IP addresses to forward the WAN messages. At this stage, connections that are determined not to correspond to the transformed messages can be eliminated/filtered from subsequent processes.

Optionally, at 260, the system determines the causal relationships among the correlated packets, again using any of a variety of conventional and novel techniques. Generally, causality can be assumed to be sequential in time. That is, a transformed packet can be assumed to be caused by one or more of the preceding original packets, and in a typical network analysis system, defining the cause to be the most immediately preceding packet is sufficient to support most network analysis tasks that rely on causality. Additionally, copending U.S. patent application Ser. No. 12/478,775, "DISCOVERY OF MULTIPLE-PARENT DEPENDENCIES IN NETWORK PERFORMANCE ANLAYSIS", filed 5 Jun. 2009, and incorporated by reference herein, discloses a technique for identifying multiple parent-dependencies for messages that are configured to avoid conventional strictly-sequential communications techniques and protocols, such as the aforementioned spoofing techniques, and other acceleration techniques.

At 270, the system displays the results of the previous processes, typically by displaying images and statistics that are based on the end-to-end propagation of messages across the network, including the propagation through devices that transform some or all of the messages.

Figure 5:
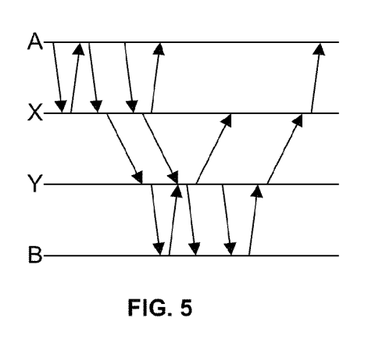
FIG. 5 illustrates an example 'bounce diagram' that includes intermediate tiers at which transformation of messages occur.

FIG. 5 illustrates an example display of a conventional "bounce diagram" that illustrates the propagation of packets from A to B, via acceleration devices X and Y. As noted above, in a conventional network analysis system, the traffic between X and Y is not associated with the traffic from A to B, and the dependency of the traffic from A to B on the characteristics of the corresponding traffic from X to Y is absent. By identifying these intermediate nodes, and their relative location in the network topology, information that is specific to these intermediate nodes can be presented, such as the time of arrival and departure of messages at each intermediate node, as illustrated in the bounce diagram of FIG. 5.

Figure 6:
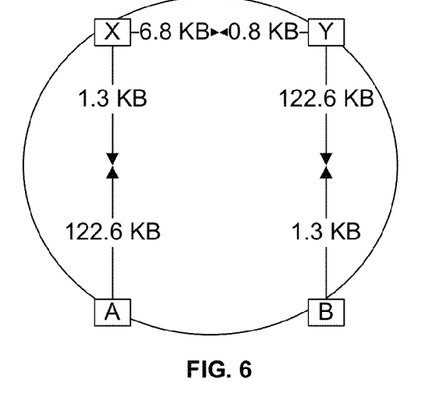
FIG. 6 illustrates an example 'tier circle' that illustrates the traffic flow between tiers of a network that includes message-altering tiers.

FIG. 6 illustrates an example display of statistics related to the traffic between A and B using a "tier circle" representation. As illustrated, for the transaction of interest, node A sends 112.6 KB to node B, and node B sends 1.3 KB to node A. In a conventional network analysis system, this traffic would be represented as a single chord between nodes A and B. In the example of FIG. 6, because it has been determined that the traffic between nodes A and B travels in a transformed manner via nodes X and Y, a more complete set of statistics can be presented by presenting information that is specific to nodes X and Y. As illustrated, node X receives the 112.6 KB of traffic addressed to node B, and sends a corresponding 6.8 KB of optimized traffic to node Y. Node Y recreates the original 112.6 KB of traffic and sends it to node B. In like manner, the 1.3 KB of traffic from B to A is communicated as 0.8 KB of traffic from Y to X.

As illustrated in this example, the inclusion of the transforming nodes X and Y in the tier circle diagram provides a clear indication of the efficiency that is being gained via the use of the WAN optimizing devices X and Y; this indication is not available in a conventional network analysis system that does not associate the traffic between X and Y to the traffic between A and B, or that does not collect data specific to the propagation of traffic through these devices X and Y.

Figure 7:
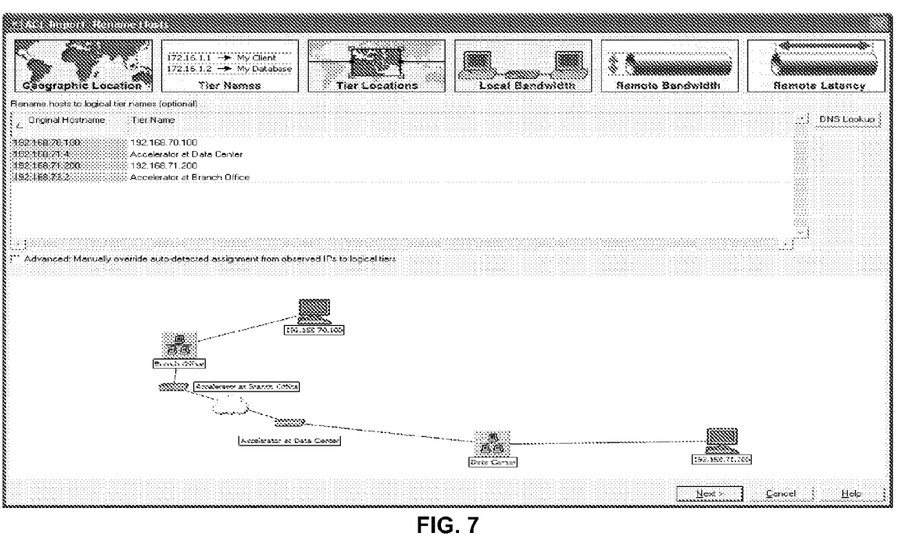
FIG. 7 illustrates an example graphic user interface that displays a determined path of messages communicated between nodes of a network that includes message-altering nodes.
Figure 8:
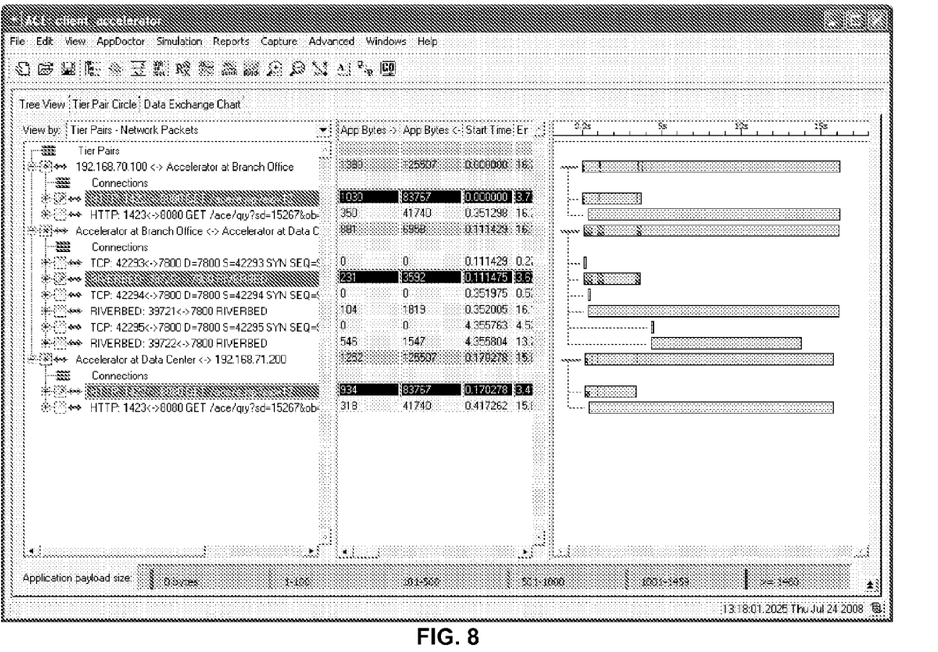
FIG. 8 illustrates an example graphic user interface that displays statistics related to application messages among nodes of a network that includes message-altering nodes.

FIGS. 7 and 8 illustrate examples of a graphic user interface for a network analysis system that embodies some or all of the features disclosed herein. FIG. 7 illustrates a display of the determined topology, and FIG. 8 illustrates a display of statistics related to a transaction, using a bar chart to illustrate the delays experienced during the propagation of messages across the various links during execution of the transaction.

Figure 9:
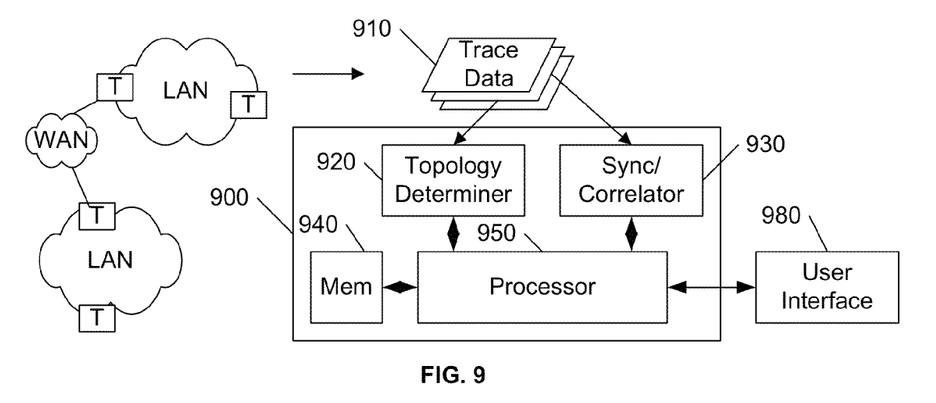
FIG. 9 illustrates an example block diagram of a system that performs end-to-end analysis of transactions in networks with traffic-altering devices.

FIG. 9 illustrates an example block diagram of a network analysis system 900 in accordance with this invention. Trace Data files 910 include traces collected by trace-collection devices T, typically from two local area networks, LANs, coupled via a WAN. The LANs include one or more acceleration devices that transform messages before they are communicated across the WAN. The transformation generally includes a transformation of the content of the message for improved communication efficiency, and/or may include a transformation of the addresses of the message. The general purpose of the system 900 is to establish a relationship between the original, transformed, and recreated message, so that the analyses of the trace data will include the transformed messages and/or transforming devices.

A topology determiner 920 is configured to process the trace data to identify the path that the messages travel between the nodes that provide the original messages, herein termed the nodes of interest, via one or more intermediate nodes that transform some or all of these original messages.

A synchronizer and correlator 930 processes the trace data to synchronize the time bases of the trace data, and to identify a correlation between the incoming messages and outgoing messages at each of the intermediate nodes, thereby identifying the outgoing transformed messages that correspond to the incoming original messages, and/or the outgoing recreated messages that correspond to the incoming transformed messages.

A processor 950 manages the operation of the determiner 920 and correlator 930, as well as managing the interactions with a user via a user interface 980. For example, the processor 950 determines which trace data files 910 to access, based on a user's identification of these files 910. The processor is also configured to solicit user input to facilitate the topology determination, synchronization, and correlation tasks. For example, to avoid a trial-and-error determination of the LAN associated with each trace file, the system initially queries the user for this information. The system also solicits user input to resolve and/or verify any questionable determinations, as necessary.

The components 920, 930, 950 of the system 900 are configured to perform their tasks using some or all of the novel techniques disclosed herein, as well as conventional network analysis techniques, depending upon the information available from the user and in the trace data. Although the routine task flow would include determining the topology and then performing the synchronization and correlation, the processor 950 is configured to enable the components as required to accomplish the overall task of providing information sufficient to perform an end-to-end analysis of the propagation of messages between the nodes of interest. For example, an initial synchronization may be performed to facilitate the determination of the topology based on the time of recording of each message, as detailed further below.

After the messages are correlated, the processor 950 is also configured to analyze the resultant timing and other relationships among the messages, to produce, for example, presentations of this information as illustrated in FIGS. 5-8. One of skill in the art will recognize that upon identifying the end-to-end propagation of messages between the nodes of interest, any of a variety of conventional network analysis presentations can be provided to the user, typically via a display at the user interface 980.

The system 900 also includes a memory 940 that facilitates the processing of the trace data by the components 920, 930, and 950. This memory 940 may also be used to store the determined topology, including, for example, the determined addresses and other parameters, so that subsequent traces can be analyzed based on this stored topology.

The memory 940 may also be configured to store one or more programs that enable some or all of these components to perform their tasks. One of skill in the art will recognize that the illustrated partitioning of components within the system 900 is provided for ease of presentation and understanding, and that alternative partitionings are possible, including for example, configuring the processor 950 to perform all of the above identified tasks.

As noted above, the above description illustrates the principles of this invention, and various alternatives can be applied to replace, augment, or verify the determinations made. The following sections are intended to illustrate example alternative techniques.

Link and Connection Determinations

In the above examples the combination of MAC addresses and IP addresses were used to determine links and connections across the links. Some optimization techniques, however, may not generate a unique combination of MAC and IP address to distinguish links and/or connections. For example, if an optimizing device does not modify the IP address, then the links will appear to only contain the flow between the target nodes. Further, because the optimized WAN messages will not match the original LAN messages, it will appear that these WAN messages are propagated in addition to LAN messages, rather than as a replacement of the LAN messages. Additionally, because the connections are not recognized as containing optimizing devices, the aforementioned difficulties in synchronizing apparently equivalent messages occurs.

Consider, for example, if the traces of FIGS. 3A-3C did not include IP addresses X and Y, and the transformed messages maintained the original IP addresses A and B. The traces of FIG. 3A would appear to be a multitude of messages between nodes A and B, with no distinction between the original LAN messages and the created WAN messages, and FIG. 3C would appear to be additional A-B and B-A messages that didn't happen to appear in the trace of FIG. 3B.

An alternative/supplemental technique for distinguishing connections to distinguish original and transformed messages when the IP address is not changed, is to note the direction of each connection. For example, in the example of FIG. 3A, the original messages from node A to node B will appear in the trace as messages from M1 to M2, whereas the corresponding transformed messages from node A to node B will appear in the trace as messages from M2 to M1. Thus, although the same IP address is used, the appearance of the same IP address as a source of one message and as a destination of another message from the same MAC interface will serve to distinguish the original traffic from the transformed traffic. In the example of FIG. 3A, for example, the flow identified as being from X to Y would be identified as a flow from A' to B', indicating that these IP addresses A and B correspond to the original IP addresses A and B but their flow is distinguished from the flow between the original IP addresses A and B.

Another alternative/supplemental technique for distinguishing flows is to note the sequence and acknowledgement numbers associated with each message. Messages with sequence numbers that are substantially monotonically increasing with time are likely to correspond to a single flow, while those messages that would introduce a non-monotonic increase are likely to correspond to a different flow. For example, if the sequence numbers of a series of messages were (501, 2001753, 515, 501218, 2001777, 2001800, 550, 501250, 2001815, 501282), the first third and seventh messages are likely to be part of one flow (501, 515, 550), the second, fifth, sixth and ninth messages are likely to be part of another flow (2001753, 2001777, 2001800, 2001815), and the fourth, eighth and tenth messages are likely to be part of a third flow (501218, 501250, 501282). Such a technique would also be viable for distinguishing the flows in the separate trace files of 3B and 3C, because it is unlikely that the sequence numbers of the WAN messages in FIG. 3C would correspond to the sequence numbers of the LAN messages of FIG. 3B, even though the IP addresses A and B would be common in each trace file.

One of skill in the art will recognize that the techniques presented herein are not mutually exclusive. For example, if the sequence numbers of two flows are too close to each other to clearly distinguish the flows, the MAC addresses may be used in conjunction with, or independent of, the sequence numbers to provide the distinction. In like manner, the distinguishing techniques need not be based on absolute criteria. For example, if the flow includes a retransmission, which will use the original sequence number, it will not necessarily be determined to be of a different flow merely because its presence indicates a decrease in the otherwise monotonically increasing series. That is, in the above example, if a subsequent packet had a sequence number of 501032, it would be considered as part of the third flow, absent any other indication that this packet is part of a new flow.

Topology Determination

If the same message can be found in each trace file, for example, in situations that include messages that are communicated across the network with no change, the recorded time of each message in each trace file can be used to identify the sequence of trace-collection devices experienced by the message. This approach requires that the traces are time synchronized, and thus the synchronization step 240 would be performed before this alternative/supplemental technique is applied to determine the topology of the network. Using the example of FIG. 4, if the trace devices were situated to monitor the links T1, T2, and T3, a message that is passed through from node A to node B would be expected to appear first at T1, second at T3, and lastly at T2. Because it is assumed that the traces on the "B" side include WAN and LAN messages, this determination would imply that the trace from T3 of FIG. 4 (FIG. 3C) includes WAN messages.

If a pair of messages can be identified, one message from A to B in each trace file, and another message from B to A in each trace file, the topology can be determined without requiring synchronization among the trace files. The difference in times of each of these messages within each trace file will indicate the relative distance of the trace file from each site A, B. Consider, for example, the message from B to A being transmitted one minute after receipt of the message from A to B. The difference in time in the trace file located at the LAN side of the site of node B is likely to be very close to one minute, whereas the difference in the trace file located at the LAN side of site A is likely to be significantly longer than one minute, because it will include the time required for the A-B message to travel from A to B, and the time required for the B-A message to travel from B to A, including the time required to process both messages through the intermediate acceleration nodes. In like manner, the trace at the WAN side of the accelerator at the B site will indicate a difference that is slightly larger than the difference at the LAN side of the accelerator at the B site, because it includes the time required for the A-B and B-A messages to be processed by the accelerator at the B site, and the trace at the WAN side of the accelerator at the A site will indicate a difference that is slightly less than the difference at the LAN side, because it excludes the time required to process the A-B and B-A messages by the accelerator at the A site. Thus, if the A-B message is followed by the B-A message, the trace file that indicates the smallest difference is at the LAN side of the accelerator at site B; the trace file that indicates the next smallest difference is at the WAN side of the accelerator at site B; the trace file that indicates the next smallest difference is at the WAN side of the accelerator at site A; and the trace file that indicates the largest difference is at the LAN side of the accelerator at site A. These relationships will be reversed if the B-A message is followed by the A-B message.

Additionally, as noted above, the user can be asked to identify the location of each trace-collection device. This direct determination can also be accomplished by including an identification of the location of the trace-collection device in each trace file. In a preferred embodiment, at least an identification of the machine used to collect the trace data is included in the trace file, allowing immediate identification of trace files that were captured at the same machine, and therefore at the same location. Preferably, the location identifier will identify the LAN to which the traced messages are associated, using pre-defined and recognizable identifiers, such as "NY Office", "SF Branch", "Corporate Data Center", and so on.

Distinguishing WAN and LAN Messages

Each of the above processes can benefit from a distinction between original and optimized packets. For example, if optimized traffic can be distinguished from conventional LAN traffic, then the conventional LAN traffic can be filtered to eliminate all LAN traffic other than the LAN traffic between the nodes of interest. The topology determination is also simplified if particular IP addresses (such as X, Y in the prior examples) are known to be associated with the optimized traffic, and not the LAN traffic.

The identification of optimized traffic may be based on device-specific or general indications. If a vendor of acceleration devices is known to use a proprietary format for accelerated messages, for example, recognition of this format in a message will indicate that the message is an optimized message.

In a more general case, acceleration devices often use particular TCP and/or UDP ports to communicate packets over a WAN. Thus, in the context of this invention, the optimized packets are likely to be associated with these ports. In like manner, acceleration devices often use particular IP protocols, such as IPSec, IPComp, etc. to communicate with each other. Often, an acceleration device will configure the network interface to include particular options that facilitate the communication of the device's optimized packets, and the configurations of the interface associated with the determined MAC addresses can often be used to identify an interface that is likely to be used for communicating optimized messages.

Other Network Configurations

As noted above, this invention has been presented using the paradigm of a pair of WAN accelerators X, Y, between two nodes of interest A, B, wherein messages from A to B are transformed into messages from X to Y, and messages from B to A are transformed into messages from Y to X. One of skill in the art will recognize that the invention is not limited to this particular set of transformations. In the example of a network address translation (NAT) device, for example, messages from A to B are transformed into messages from X to B, wherein X is the substituted address for address A. Such a configuration does not require a pair of transforming devices, and does not require a transformation of both source and destination addresses. In this example, the same technique of assessing the MAC addresses and IP addresses detailed above can be used to determine the topology as A-X-B, and then correlate the messages based on this determined topology. Each of the other above detailed techniques may also be applied, depending upon the particular characteristics of the trace files.

In like manner, communications between nodes A and B via NAT devices on each connection would appear as communications from X to B (as above), and Y to A, where Y is the substituted address for address B. One or more of the techniques detailed above can readily be applied, depending upon the characteristics of the trace files, to determine the topology as A-X-Y-B, and correlate the messages based on this topology.

Other Analyses

In addition to displaying the various statistics that can be derived from the tracing of correlated messages through intermediate nodes that transform some or all of the messages, the data collected can also be used to perform other analyses, including, for example, causal analyses and 'what-if' analyses.

U.S. published application 2008/0019278, "NETWORK CONGESTION ANALYSIS", published 24 Jan. 2008, for Steve Niemczyk, Patrick J. Malloy, Alain J. Cohen, and Russell M. Elsner, discloses techniques for identifying critical paths in applications that include multiple paths, and techniques for determining where improvements can be made and estimating the gains that may be achieved by such improvements, and is incorporated by reference herein. Copending U.S. patent application Ser. No. 12/478,775, "DISCOVERY OF MULTIPLE-PARENT DEPENDENCIES IN NETWORK PERFORMANCE ANLAYSIS", filed 5 Jun. 2009 for Steve Niemczyk, Antoine Dunn, Dana Znamova, Russell Elsner, and Patrick Malloy, extends this analysis by determining multiple-parent dependencies in the propagation of messages in networks that include proxy devices and other performance enhancing devices, and is also incorporated by reference herein. By the use of this invention for identifying the characteristics of such performance enhancing devices, the potential gains that can be achieved by modifications to the network or the devices can be determined.

In like manner, U.S. Published Application 2007/0067296, "Network Capacity Planning", published 22 Mar. 2007 for Patrick Malloy, Dana Znamova, Alain Cohen, Antoine Dunn, John Strohm, Abbas Ali, and Russell Elsner, and incorporated by reference herein, discloses techniques for determining application response time based on simulations of a network. By the use of this invention to identify the characteristics of the intermediate nodes within the network that are configured to provide enhanced performance to such applications, the advantages provided by the use of such performance enhancing devices can be ascertained. In the case of devices such as WAN optimizing devices, the parameters of such devices are configured to best match the characteristics of the WAN and LAN networks to which they are attached. By the use of this invention to characterize the optimizing devices, various alternative configurations of the device and/or the networks can be assessed via simulations to determine optimal sets of configurations.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may include a processor, and software portions may be stored on a computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A network analysis system comprising:
   a processor that is configured to receive a plurality of traces that include records of messages communicated between a first and second node of interest
   a topology determiner that is configured to determine an end-to-end path for communicating the messages between the first and second node of interest, the endto-end path including one or more intermediate nodes that transform one or more first messages between the first and second nodes of interest to create corresponding transformed messages that are communicated on a portion of the end-to-end path, and a correlator that is configured to correlate the first messages and the transformed messages that are identified in the plurality of traces based on the determined end-to-end path, wherein the processor is further configured to display information based on the correlation of messages along the end-to-end path, including information that is specific to the one or more intermediate nodes.

2. The network analysis system of claim 1, wherein the topology determiner is configured to:

distinguish traffic flows based on the traces, including one or more traffic flows that include the first messages and the transformed messages, and determine a topological arrangement of the one or more intermediate nodes with respect to the first and second nodes based on the traffic flows.

3. The network analysis system of claim 2, wherein the topology determiner is configured to distinguish the traffic flows based on one or more MAC addresses associated with the first and transformed messages.

4. The network analysis system of claim 3, wherein the topology determiner is configured to distinguish the traffic flows based on one or more IP addresses associated with the first and transformed messages.

5. The network analysis system of claim 4, wherein the topology determiner is configured to distinguish the traffic flows based on a distinction between source and destination MAC addresses associated with the one or more IP addresses.

6. The network analysis system of claim 2, wherein the topology determiner is configured to distinguish the traffic flows based on one or more sequence numbers associated with the messages.

7. The network analysis system of claim 1, wherein the topology determiner is configured to identify the one or more intermediate nodes based on the traces.

8. The network analysis system of claim 1, wherein the topology determiner is configured to identify the one or more intermediate nodes based on one or more MAC addresses associated with the first and transformed messages.

9. The network analysis system of claim 8, wherein the topology determiner is configured to identify the one or more intermediate nodes based on one or more IP addresses associated with the first and transformed messages.

10. The network analysis system of claim 9, wherein the topology determiner is configured to identify the one or more intermediate nodes based on a distinction between source and destination MAC addresses associated with the one or more IP addresses.

11. The network analysis system of claim 1, wherein the topology determiner is configured to determine the end-to-end path based on a set of times associated with propagation of a select message at the intermediate nodes.

12. The network analysis system of claim 1, wherein at least one of the first messages and the transformed messages have distinguishing characteristics, and the topology determiner is configured to distinguish the first messages from the transformed messages based on these distinguishing characteristics.

13. The network analysis system of claim 12, wherein the topology determiner is configured to identify the one or more intermediate nodes based on the distinguishing characteristics.

14. The network analysis system of claim 1, wherein the correlator includes a synchronizer that is configured to adjust one or more of the time bases of the traces to establish a common time base among the traces.

15. The network analysis system of claim 1, wherein the correlator is configured to identify causal relationships between the first messages and the transformed messages.

16. The network analysis system of claim 1, wherein the transformed messages include a transformation of addresses of the first messages.

17. The network analysis system of claim 1, wherein the transformed messages include a transformation of content of the first messages.

18. The network analysis system of claim 1, wherein the transformed messages include a transformation of addresses and content of the first messages.

19. The network analysis system of claim 1, wherein the correlator is further configured to correlate the transformed messages and second messages, the second messages being recreations of the first messages from the transformed messages.

20. The network analysis system of claim 19, wherein the correlator is configured to identify causal relationships between the transformed messages and the second messages.

21. A method comprising:

receiving, by a network analysis system, a plurality of traces that include records of messages communicated between a first and second node of interest, determining, by the network analysis system, an end-to-end path for communicating the messages between the first and second node of interest based on the plurality of traces, the end-to-end path including one or more intermediate nodes that transform one or more first messages between the first and second nodes of interest to create corresponding transformed messages that are communicated on a portion of the end-to-end path, correlating, by the network analysis system, the first messages and the transformed messages that are identified in the plurality of traces, based on the determined end-to-end path, and displaying, by the network analysis system, information based on the correlation of messages along the end-to-end path, including information that is specific to the one or more intermediate nodes.

22. The method of claim 21, wherein determining the end-to-end path includes:

distinguishing traffic flows based on the traces, including one or more traffic flows that include the first messages and the transformed messages, and determining a topological arrangement of the one or more intermediate nodes with respect to the first and second nodes based on the traffic flows.

23. The method of claim 22, wherein distinguishing the traffic flows includes distinguishing between source and destination MAC addresses associated with one or more IP addresses.

24. The method of claim 22, wherein distinguishing the traffic flows includes distinguishing the traffic flows based on one or more sequence numbers associated with the messages.

25. The method of claim 21, wherein determining the end-to-end path includes identifying the one or more intermediate nodes based on a distinction between source and destination MAC addresses associated with one or more IP addresses.

26. The method of claim 21, wherein determining the end-to-end path includes determining the end-to-end path based on a set of times associated with propagation of one or more select messages at the intermediate nodes.

27. The method of claim 21, wherein at least one of the first messages and the transformed messages have distinguishing characteristics, and distinguishing the first messages from the transformed messages is based on these distinguishing characteristics.

28. The method of claim 21, including identifying causal relationships between the first messages and the transformed messages.

29. The method of claim 21, wherein the transformed messages include a transformation of addresses and content of the first messages.

30. The method of claim 21, including correlating the transformed messages and second messages, the second messages being recreations of the first messages from the transformed messages.

31. A non-transitory computer-readable medium that includes a program that, when executed by a processor, causes the processor to:
receive a plurality of traces that include records of messages communicated between a first and second node of interest,
determine an end-to-end path for communicating the messages between the first and second node of interest based on the plurality of traces, the end-to-end path including one or more intermediate nodes that transform one or more first messages between the first and second nodes of interest to create corresponding transformed messages that are communicated on a portion of the end-to-end path,
correlate the first messages and the transformed messages that are identified in the plurality of traces, based on the determined end-to-end path, and
display information based on the correlation of messages along the end-to-end path, including information that is specific to the one or more intermediate nodes.

32. The medium of claim 31, wherein the program causes the processor to:
distinguish traffic flows based on the traces, including one or more traffic flows that include the first messages and the transformed messages, and
determine a topological arrangement of the one or more intermediate nodes with respect to the first and second nodes based on the traffic flows.

33. The medium of claim 32, wherein the program causes the processor to distinguish between source and destination MAC addresses associated with one or more IP addresses to distinguish traffic flows.

34. The medium of claim 32, wherein the program causes the processor to distinguish the traffic flows based on one or more sequence numbers associated with the messages.

35. The medium of claim 31, wherein the program causes the processor to identify the one or more intermediate nodes based on a distinction between source and destination MAC addresses associated with one or more IP addresses.

36. The medium of claim 31, wherein the program causes the processor to determine the end-to-end path based on a set of times associated with propagation of one or more select messages at the intermediate nodes.

37. The medium of claim 31, wherein at least one of the first messages and the transformed messages have distinguishing characteristics, and the program causes the processor to distinguish the first messages from the transformed messages based on these distinguishing characteristics.

38. The medium of claim 31, wherein the program causes the processor to identify causal relationships between the first messages and the transformed messages.

39. The medium of claim 31, wherein the transformed messages include a transformation of addresses and content of the first messages.

40. The medium of claim 31, the program causes the processor to correlate the transformed messages and second messages, the second messages being recreations of the first messages from the transformed messages.

* * * * *